United States Patent [19]

Crane et al.

[11] Patent Number: 5,615,511
[45] Date of Patent: Apr. 1, 1997

[54] FISHING LURE RETRIEVING APPARATUS

[76] Inventors: Gordon Crane; Paul Crane, both of 125 Turnbull Court, Unit 10, Cambridge, Ontario N1T 1H8, Canada

[21] Appl. No.: 536,455

[22] Filed: Sep. 29, 1995

[51] Int. Cl.$^6$ .................................................. A01K 97/24
[52] U.S. Cl. ............................................. 43/17.2; 43/26.1
[58] Field of Search .................................... 43/17.2, 26.1

[56] References Cited

U.S. PATENT DOCUMENTS

| | | | |
|---|---|---|---|
| 488,847 | 12/1892 | Squires et al. | 43/17.2 |
| 2,175,135 | 10/1939 | Sorenson et al. | 43/17.2 |
| 2,507,495 | 5/1950 | Barthel . | |
| 2,683,322 | 7/1954 | Clark | 43/17.2 |
| 2,707,843 | 5/1955 | Howe | 43/26.1 |
| 2,804,712 | 9/1957 | Jackson . | |
| 2,828,570 | 4/1958 | Bradbury . | |
| 2,866,290 | 12/1958 | Karry | 43/17.2 |
| 3,186,121 | 6/1965 | Jones . | |
| 3,574,967 | 4/1971 | Splawinski . | |
| 3,613,284 | 10/1971 | Anderson | 43/26.1 |
| 3,792,545 | 2/1974 | Hendrickson . | |
| 3,805,435 | 4/1974 | Serrill | 43/17.2 |
| 4,057,925 | 11/1977 | Wong | 43/17.2 |
| 4,145,832 | 3/1979 | Knight, Jr. | 43/17.2 |
| 4,152,859 | 5/1979 | Hansen . | |
| 4,182,066 | 1/1980 | Harmon | 43/17.2 |
| 5,016,385 | 5/1991 | Blease . | |
| 5,077,929 | 1/1992 | Khan | 43/26.1 |

*Primary Examiner*—Joseph J. Hail, III
*Assistant Examiner*—Darren Ark
*Attorney, Agent, or Firm*—McFadden, Fincham

[57] ABSTRACT

There is disclosed a lure retriever for retrieving a lure on a fishing line, comprising a body, a lure release member mounted to the body and for releasing a snagged lure, and a friction drive system for engagement with the fishing line to advance the lure release member to a snagged lure. This has the advantage of preventing disengagement of the fishing line with the lure which would otherwise occur when the user simply pulls the fishing line. In addition to the foregoing advantage, the friction drive system provided on the apparatus, permits the apparatus to be drivable in a variety of either positive or negative inclinations. This circumvents the difficulties previously encountered in prior art arrangements.

18 Claims, 2 Drawing Sheets

FISHING LURE RETRIEVING APPARATUS

FIELD OF THE INVENTION

The present invention is directed to a lure retrieving apparatus and more particularly, the present invention relates to a lure retrieving apparatus which is drivable along a fishing line.

BACKGROUND OF THE INVENTION

Lure retrievers have been available for many years and to this end, there is a panoply of various devices specifically for retrieving snagged or lodged lures.

Typical of the prior art known is U.S. Pat. No. 4,182,066, issued Jan. 8, 1980 to Harmon. Reference provides a body with the convention retrieval line. The body is adapted to be guided to the point of the snagged lure at which point, the device frees the snagged lure. The Harmon arrangement employs a self-contained propulsion system on the body for propelling the body to the snagged lure. This is a useful arrangement, however, it would appear that the Harmon arrangement is limited in that it may not function adequately in situations where there is a high current as this may impair the propulsion system or otherwise render ineffective the apparatus.

Turning to U.S. Pat. No. 2,804,712, issued Sep. 3, 1957 to Jackson, Jackson provides an electrically controlled troller. In the arrangement shown, there is provided a submersible unit which is driven by a typically propeller system which is driven by a DC battery system. Even if one were to employ the arrangement illustrated by Jackson as a lure retrieval arrangement, it would appear that this arrangement would be susceptible to inefficiency in a high current situation.

Hendrickson, in U.S. Pat. No. 3,792,545, issued Feb. 19, 1974, provides a lure retriever which must be slipped over the line and subsequently submerged to the point where the lure is snagged. It would appear that this system operates on a weight concept and, as in the arrangements set forth hereinabove, this arrangement would appear to be limited in situations where high current would be experienced. As an additional disadvantage, the Hendrickson arrangement provides a hook which is retractable about the fishing line and more precisely about the point of connection to the lure to the fishing line. Once this position is reached, the hook is retracted into the body such that the lure is in a frictionally retained relationship with the body. Although this arrangement is useful to a certain degree, it would appear that a potential exists for possible damage to the lure.

U.S. Pat. No. 3,574,967, issued to Splawinski, Apr. 13, 1971, provides a fish bait retriever and reel assembly. In the embodiment illustrated by the patentee, a pair of concentric loops are provided with the operation being that the larger loop slips over the top of the lure for eventual contact with the hook portion of the lure. Once this is achieved, a second inwardly disposed loop abuts the hook portion of the lure and then the entire locked arrangement is pulled to the surface thus retrieving the lure and unsnagging the hook portion thereof. The arrangement shown appears to be useful to a certain degree, however, the arrangement appears to be particularly susceptible to difficulties in high current situations. The concentric rings must be separated in order for the device to operate properly and in a high current situation, it would appear that this apparatus may be completely closed therefore ineffective for grasp of the hook portion of the lure. In addition to the foregoing, there would appear to be a potential for lure damage as the loops must slide over the top of the lure which may scratch the finish on the lure, etc.

Additional references which are generally related to this subject matter include U.S. Pat. Nos. 2,507,495, 2,828,570, 3,186,121, 4,152,859 and 5,016,385.

In view of what has been previously proposed in the art, it is clear that a need exists for a more effective lure retrieval which is not susceptible to high current conditions nor which operates purely on gravity to arrive to the point of the snagged lure. The present invention is directed to providing an improved arrangement which obviates the limitations in the known art.

It will be understood that where the apparatus is used in water bodies having a significant current or where the water has a higher buoyancy due to salt content, effervescence etc., the apparatus may be made less buoyant by the addition of removable weights or other suitable means.

SUMMARY OF THE INVENTION

One object of the present invention is to provide an improved lure retrieval mechanism.

A further object of the present invention is to provide a lure retriever for retrieving a lure on a fishing line, comprising:

a body;

a lure release member mounted to the body and for releasing a snagged lure; and friction drive means for engagement with the fishing line to advance the lure release member to a snagged lure.

The release member employed in the lure retriever will comprise a generally hooked-shaped member pivotally connected to the body. In a preferred form, the apparatus includes a hook-like projection at one end and may include a rubberized coating so as not to mar or scratch the finish of the lure. In addition, it is desirable that the release member comprise a stainless steel or other substantially non-corroding metal.

A further object of the present invention is to provide a fishing lure retriever having a body and a lure retrieving mechanism, the improvement comprising:

a friction drive means for frictionally engaging a fishing line whereby the lure retriever is movable on the fishing line in positive and negative inclinations.

It has been found that the use of a friction drive means is particularly useful since this system is not affected by high current conditions in view of the fact that it does not operate under gravity. By providing line engaging drive means, it is the article which is driven along the fishing line as opposed to simply sliding down under gravity.

Advantageously, by providing such a drive mechanism, the apparatus may be operated in a positive or negative incline. This is particularly useful where user may be fly fishing where there is a significant amount of rapid casting. In this situation, there is a chance that the lure can become lodged in a tree or some other overhead obstacle. In the prior art arrangements, retrieval would be impossible due to the fact that the prior art arrangements operate on a gravity principal. It has been found that by providing the drive system on the fishing line that retrieval is expedient.

In one embodiment, the drive means may comprise a rotatable drive shaft which has a groove therein for receiving a loop of fishing line. In this arrangement, the drive shaft will have an enlarged end portion such that the apparatus does not slip off the fishing line.

According to a further embodiment, the drive means may comprise a compression roller system where one roller is driven while the other is idle and travels therealong. In this system, the fishing line is compressively engaged between the rollers.

In terms of the rotatable shaft and groove arrangement, the groove will be configured to positively engage the fishing line and be composed of a material having a high coefficient of friction thus further ensuring positive engagement with the line.

A still further object of the present invention is to provide a lure retriever apparatus comprising:

a body;

a lure releasing member extending from the body and pivotally connected thereto;

a rotatable drive shaft extending outwardly of the body, the drive shaft for receiving a loop of fishing line thereabout for frictional contact therewith; and means for actuating the drive shaft.

In the arrangement provided with the present invention, the drive shaft and/or roller system may be reversible. In addition, it is fully contemplated that the arrangement could be remotely controllable by a small transmitter suitably connected to the body and hand-held transmitter for the user.

Having thus described the invention, reference will now be made to the accompanying drawings illustrating preferred embodiments.

BRIEF DESCRIPTION OF THE DRAWINGS

FIG. 3 is a top cutaway view illustrating the engagement of the fishing line on the drive shaft;

FIG. 4 is a section on line 4—4 of FIG. 3;

Similar numerals in the drawings denote similar elements.

DETAILED DESCRIPTION OF THE PREFERRED EMBODIMENTS

Figure 1:
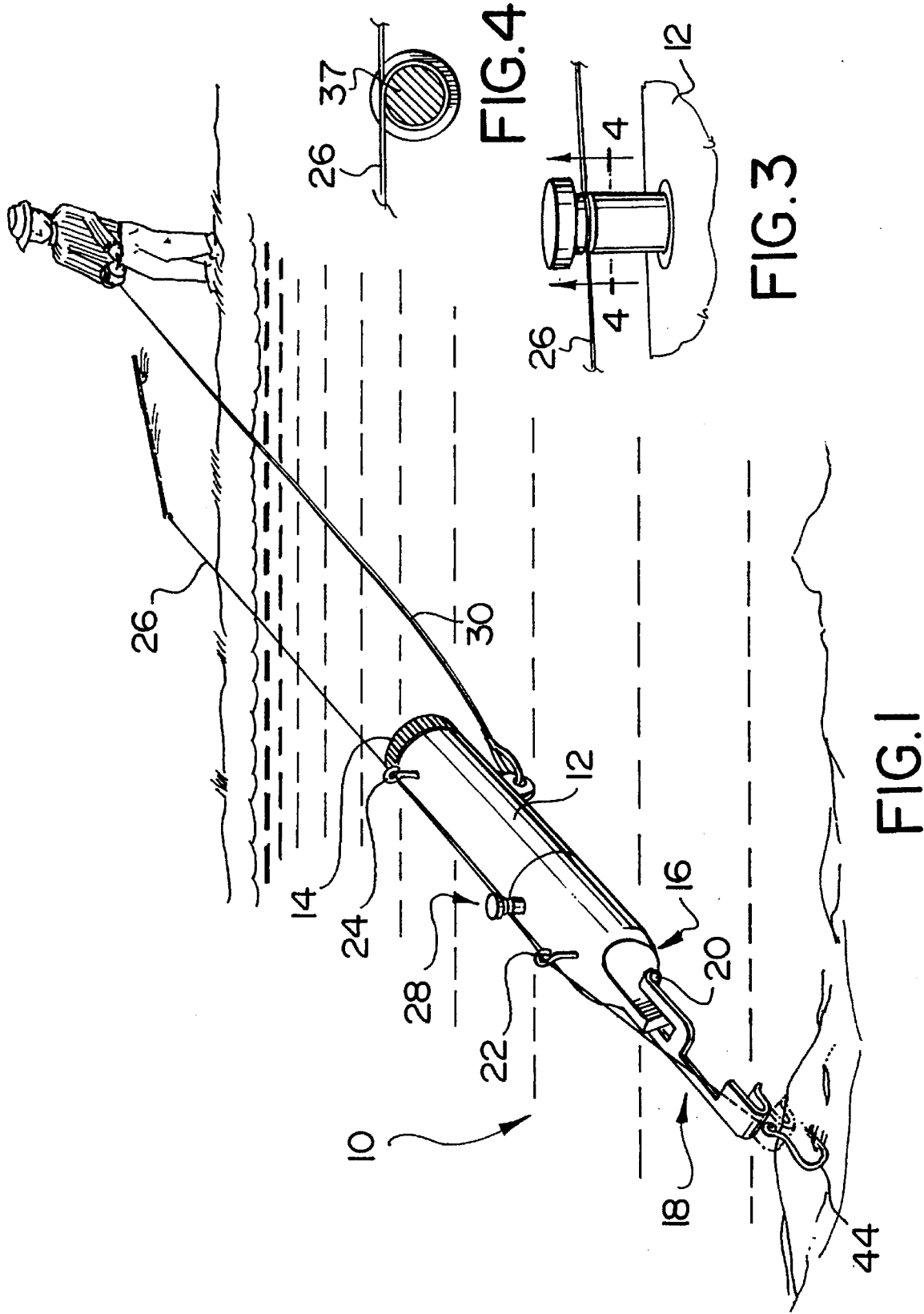
FIG. 1 is a perspective view of the lure retriever in use according to one embodiment of the present invention.

Referring now to FIG. 1, shows a perspective view of the invention in use according to a first embodiment. A lure retriever, globally denoted by numeral 10, includes submersible body 12 and opposed ends 14 and 16. End 16 includes in a pivotally connected relationship a lure release mechanism, generally denoted by numeral 18. The lure release mechanism 18 is pivotally connected at pivot point 20 at end 16. On a top portion of the body 12, there is included a pair of spaced-apart guide members 22 and 24 for receiving and guiding retrieving apparatus 10 on a fishing line, generally denoted by numeral 26. Intermediate guides 22 and 24 there is provided a drive mechanism 28 for frictionally engaging the fishing line 26. The drive 28 will be discussed hereinafter in greater detail.

The drive 28 is designed such that the same positively engages the fishing line 26 such that retrieving apparatus 10 is advanced along the fishing line 26 to a caught lure by the engagement of the drive with the fishing line. A return line 30 is provided to exert the necessary force directly to the snagged lure to facilitate its release and retrieve the unit 10 once the lure (not shown) has been unsnagged.

Figure 2:
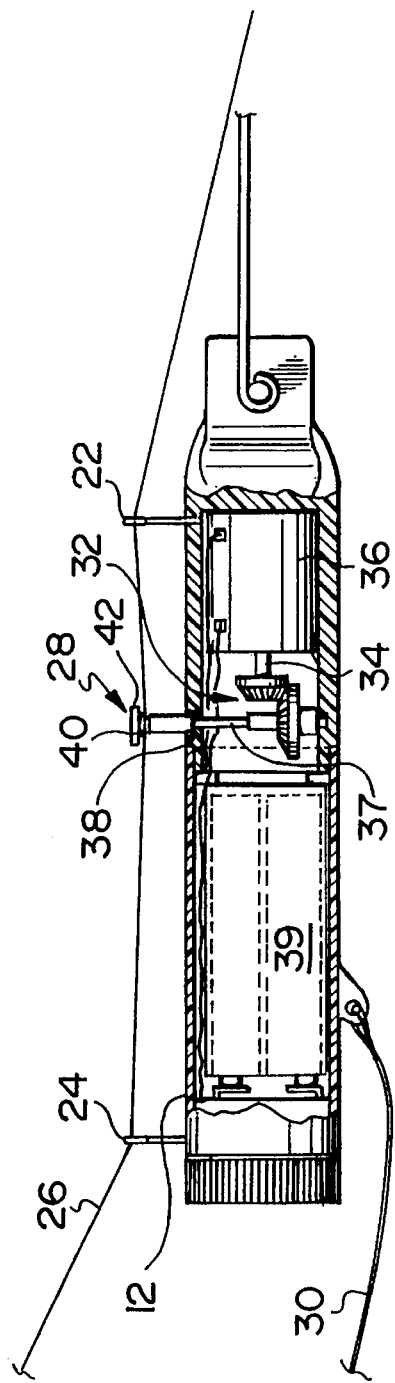
FIG. 2 is an enlarged sectional view illustrating the drive mechanism.

Turning to FIG. 2, shown is an enlarged cutaway view of the drive mechanism 28 briefly discussed with respect to FIG. 1. The drive mechanism includes an actuation member 32, the actuation member comprising a 90° gearbox as illustrated in FIG. 2. One output shaft 34 of gearbox 32 is directly connected to a power source, shown in the example to comprise a DC motor, generally denoted by numeral 36 with batteries denoted by numeral 39. A drive shaft 37 extends from the gearbox 32 and extends outwardly of the body 12. To this end, a seal 38 is provided about the drive shaft 37 to prevent the ingress of water and/or moisture within the body 12. The drive shaft 37 includes an annular groove 40 for receiving a loop (not shown) of fishing line thereabout. Spaced from annular groove 40, is the terminal end 42 of drive shaft 37, the terminal end having an enlarged diameter relative to the groove 40. This ensures that once the loop of fishing line is positioned in the groove that the loop does not slip off inadvertently.

In use, the device 10 travels along the fishing line 26 and is guided thereby with the guides 22 and 24 and driven along the fishing line 26 by engagement of the fishing line with the groove 40 of drive shaft 37. The lure retrieval member 18, once the apparatus 10 arrives at the location of the snagged lure, the latter being denoted by numeral 44, slips over the snagged lure 44 to engage the same. Once the retrieving mechanism 18 is engaged with the lure 44, the user then can simply retrieve the apparatus 10 via retrieval line 30. Once the retrieving mechanism 18 is engaged with the lure 44, as indicated by the end of the forward motion of the apparatus 10, the user then applies the necessary force to the retrieval line 30 to free lure 44 from the obstruction. The user may then simply retrieve the apparatus 10 via retrieval line 30. This has the distinct advantage of preventing disengagement of the line 26 from becoming disengaged from lure 44.

FIG. 4 illustrates in greater detail, the engagement of line 26 with groove 40 on spindle 37. As is illustrated, the line is looped about the groove 40 to ensure positive contact.

It will be understood by those skilled in the art that although a single groove is shown in the drawings, it is clearly contemplated that the groove could be in the form of a helix.

Figure 5:
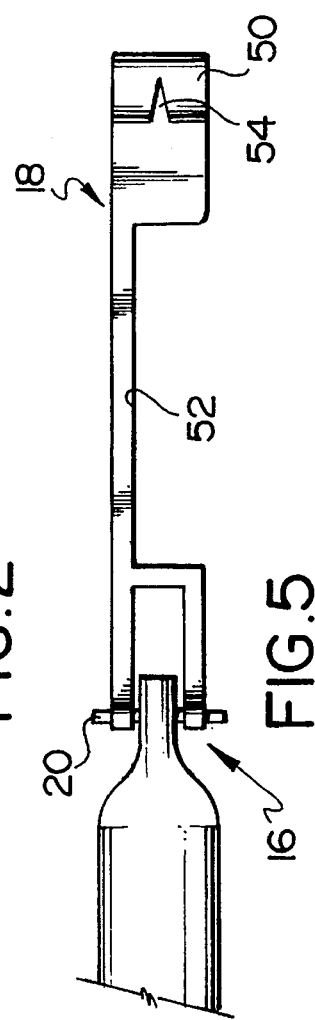
FIG. 5 is a view of the lure retrieval mechanism.

FIG. 5 illustrates one embodiment of the lure retrieving mechanism 18 having a U-shaped hook member 50 and an arm 52. Member 50 includes opening 54 for receiving a portion of fishing line (not shown). The hook member 50 is useful for slipping over a snagged line as discussed above.

Figure 6:
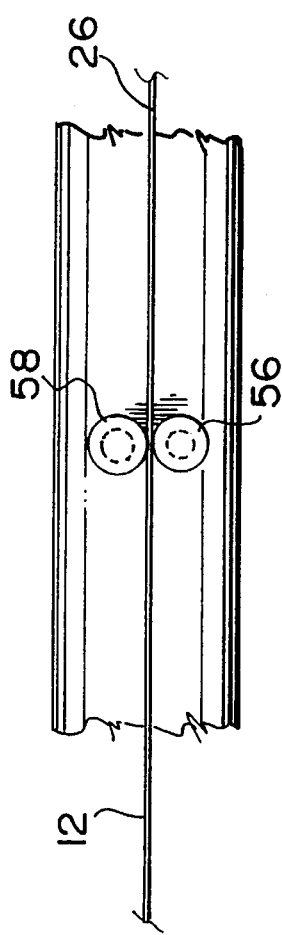
FIG. 6 is a sectional view illustrating an alternate embodiment for the drive mechanism of the lure retriever.

Turning now to FIG. 6, shown is a further embodiment according to the present invention. In this embodiment, the rotatable drive shaft (not shown) is replaced by a pair of co-acting rollers 56 and 58, which rollers receive in frictional contact the fishing line 26 therebetween. For simplicity, the roller 58 may be driven by the gear arrangement 32 herein previously described, while roller 56 may simply be an idler roller. It will be appreciated that the rollers 56 and 58 need not be in a horizontal coaxial relationship, but rather may be in a vertical relationship.

Although embodiments of the invention have been described above, it is not limited thereto and it will be apparent to those skilled in the art that numerous modifications form part of the present invention insofar as they do not depart from the spirit, nature and scope of the claimed and described invention.

We claim:

1. A lure retriever for retrieving a lure on a fishing line, comprising:

a body;

a lure releasing member mounted to said body and for releasing a snagged lure; and line engaging friction drive means connected to said body for direct engagement with said fishing line and to advance said lure release member to a snagged lure.

2. The lure retriever as set forth in claim 1, wherein said friction drive means includes actuation means for actuating said drive means.

3. The lure retriever as set forth in claim 2, wherein said actuation means comprises a DC motor.

4. The lure retriever as set forth in claim 1, wherein said lure retriever further includes guide means connected to said body for guiding said body on said fishing line to a snagged lure.

5. The lure retriever as set forth in claim 1, wherein said lure retriever further includes a retrieval line for retrieving said lure retriever.

6. The lure retriever as set forth in claim 1, wherein said retriever is self-propelled.

7. The lure retriever as set forth in claim 1, wherein said retriever is remotely controllable.

8. The lure retriever as set forth in claim 1, wherein said lure release member comprises a hook-shape member for engaging a snagged lure.

9. A fishing lure retriever having a body and a lure retrieving mechanism, the improvement comprising:

a friction drive means for frictionally engaging a fishing line, said friction drive means comprising an outwardly extending rotatable spindle for engaging said line whereby said lure retriever is movable on said fishing line in positive and negative inclinations.

10. The lure retriever as set forth in claim 9, wherein said friction drive means further includes actuation means and gear means extending between said actuation means and said friction drive means.

11. The lure retriever as set forth in claim 10, wherein said spindle includes an annular groove recessed therein for receiving a loop or fishing line.

12. The lure retriever as set forth in claim 10, wherein said actuation means includes a DC drive motor, said gear means comprising a 90° gear reducer.

13. A lure retriever apparatus comprising:

a body;

a lure releasing member extending from said body and pivotally connected thereto;

a rotatable drive shaft extending outwardly of said body, said drive shaft for receiving a loop of fishing line thereabout for frictional contact therewith; and means for actuating said drive shaft.

14. A lure retriever as set forth in claim 13, wherein said rotatable drive shaft includes a recessed annular groove for receiving said loop of fishing line therein.

15. A lure retriever as set forth in claim 13, wherein said lure retriever is remotely controllable.

16. A lure retriever as set forth in claim 15, wherein said rotatable drive shaft is rotatable in a forward direction and in a reverse direction.

17. A lure retriever as set forth in claim 13, wherein said means for actuating said shaft comprises a DC motor.

18. A lure retriever as set forth in claim 13, wherein said lure retriever further includes a retrieval line for retrieving said lure retriever.

* * * * *